United States Patent

[11] 3,614,091

| [72] | Inventor | Francesco Bernardis<br>Ivrea, Italy |
|---|---|---|
| [21] | Appl. No. | 844,739 |
| [22] | Filed | July 22, 1969 |
| [45] | Patented | Oct. 19, 1971 |
| [73] | Assignee | Ing. C. Olivetti & Co., S.p.A.<br>Ivrea (Torino), Italy |
| [32] | Priority | July 30, 1968 |
| [33] | | Italy |
| [31] | | 52633-A/68 |

[54] DOCUMENT FEEDING DEVICE
1 Claim, 2 Drawing Figs.

[52] U.S. Cl. ................................................ 271/52,
                                                   271/57
[51] Int. Cl. ............................................... B65h 9/16
[50] Field of Search .................................. 271/52, 57,
                                                   49, 59

[56] References Cited
UNITED STATES PATENTS
1,581,120  4/1926  Hitchcock ..................... 271/52

3,107,089  10/1963  Lockey ........................ 271/52
3,175,824   3/1965  Albosta ........................ 271/52
3,178,175   4/1965  Hohmann ..................... 271/52

*Primary Examiner*—Joseph Wegbreit
*Attorney*—Irons, Birch, Swindler & McKie

ABSTRACT: A device for feeding and reading documents is disclosed. The documents are introduced one at a time into the receiving means of the device and fed to an aligning means moving each received document along an aligning path. The aligning means comprise a driven first plurality of rollers adapted to act frictionally on a side of the received document and a plurality of second rollers acting frictionally on the opposed side of the same document. The second rollers have their spindles resiliently skewed obliquely with respect to the aligning path so as to urge the moving document transversely of the path against a reference surface. The apparatus includes also means for conveying the moving document past a reader and delivering it to a collecting pocket disposed in the opposite direction to the aligning path. The pocket collects and presses the successive documents as delivered by the conveying device.

INVENTOR.
FRANCESCO BERNARDIS

DOCUMENT FEEDING DEVICE

The present invention relates to a document feeding device which can be used in an apparatus for reading documents, for example checks, bearing imprinted coded symbols and having a rectangular shape of varying dimensions. The device is particularly useful in apparatus in which the documents are introduced manually one at a time.

As is known, checks always require precise alignment to permit the reading of coded symbols in the form of holes or magnetic or optical characters in automatic check readers. Moreover, since the checks are of various dimensions and are normally made of fairly thin paper, their feed requires special expedients for achieving reliable and precise alignment.

If the documents are introduced by hand, they may be inserted with an incorrect orientation and it is therefore necessary that the reading stage be preceded by a stage of alignment of each single document, also avoiding a badly oriented document becoming damaged by the arrangement for feeding the documents along the conveying path disposed between the insertion opening and the collecting pocket or compartment.

Various document feeding devices are known in which the documents are removed from a stack and fed one at a time, or in which the documents are inserted by hand one at a time in a direction parallel to a predetermined side of the documents themselves. These arrangements are generally very complicated and costly and, moreover, only ensure the individual feed of two documents without preventing a document which is not exactly aligned being read wrongly or being considered invalid by the reading check device.

In some known kinds of apparatus, the means which effect the alignment of the documents with a reference surface, in such manner as to center the strip of the document on which the data is recorded with respect to the reading device, are constituted by rollers rotating about spindles which are in an oblique position with respect to the conveying path and disposed so that their peripheries urge the documents frictionally along the path, that is in such manner as to provide the conveying movement with a component directed towards the reference surface. Since, in these aligning means, the obliquity of the spindles is fixed, in the case of thin documents which are not sufficiently strong and for particular values of the friction between the rollers and the surface of the documents there may be damage to the aligning edge of the documents themselves, inasmuch as if they were already aligned they are pressed excessively against the alignment reference surface. In consequence, misalignment with respect to the reading device occurs. So as to reduce the possibility of such damage, in some kinds of apparatus that length of path where the rollers with inclined spindles act is very short and the alignment is further achieved with the aid of a diversion of the path in a sense transverse of the direction of advance. This solution has the fault of causing the conveying path to occupy a larger space both in the longitudinal direction and in the transverse sense.

The object of this invention is to obviate such drawbacks. According to the invention there is provided a document feeding device comprising a plurality of driven first rollers adapted to act frictionally on a document to move the document along a feed path, and a plurality of second rollers which also act frictionally on the document and have their spindles normally skewed obliquely with respect to the feed path so as to urge the document transversely of the path against a reference surface, the said spindles being resiliently biased into the skewed position so that the reaction by the document on the second rollers can rotate the spindles till they are substantially perpendicular to the feed path when the document is fully against the reference surface.

The invention will be described in more detail, by way of example, with reference to the accompanying drawings, in which.

The documents are substantially rectangular, for example in the form of checks, and must be introduced into the reader by hand one at a time in a direction parallel to one side of the documents themselves. The characters are generally imprinted in one line of the document which is parallel to one side of the document and are read by causing the document to advance horizontally in the direction of the line itself.

Figure 1:
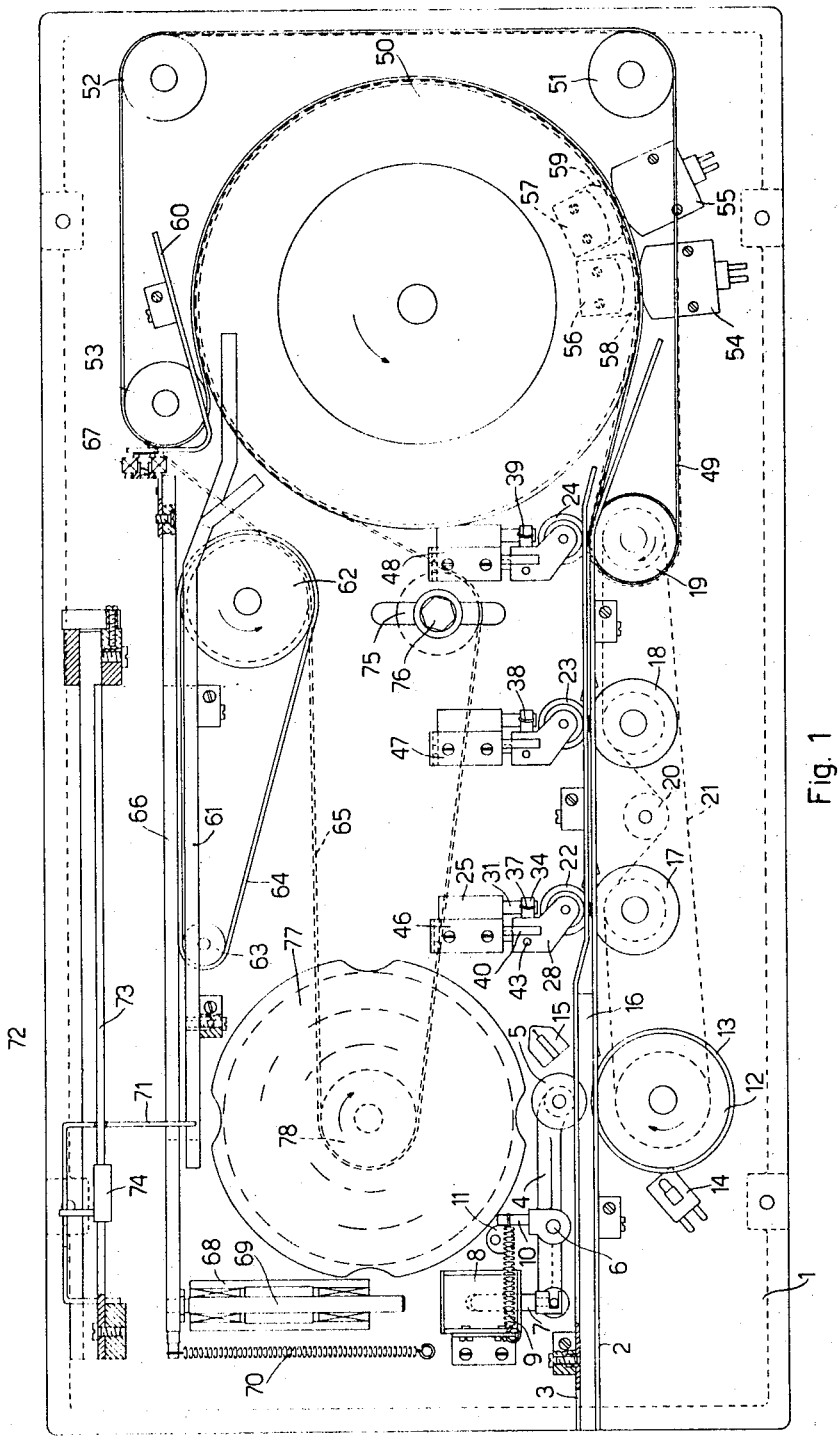
FIG. 1 is a plan view of a document feeding device embodying the invention, incorporated in an apparatus for reading printed characters.

The document reading apparatus (FIG. 1) is mounted on a supporting plate 1 disposed in a horizontal position. The feed arrangement comprises an insertion opening for the documents which is defined by two guide plates 2, 3 disposed perpendicularly to the supporting plate and fixed to the latter. Inside the insertion opening, a roller 12 with a rubber covering 13 and in continuous rotation projects through a slot in the plate 2. A roller 5 which is mounted on a lever 4 pivoted at 6 and controllable by means of an armature 7 by an electromagnet 8 can project into the insertion opening through another slot in the plate 3. The lever 4 is held in the inoperative position, in which the roller 5 is spaced from the roller 12, by a spring 9 acting on an arm 10 of the lever and by a stop 11 which operates on the arm 10. The base of the insertion opening is formed by a thin flexible strip or tongue 16 in contact with the face of the supporting plate 1 over almost the entire length of the insertion opening, except at the right-hand end, where it is slightly raised so as to avoid possible stopping or jamming of the documents introduced, as will be better explained hereinafter. A light beam produced by a lamp 14 and picked up by a photoelectric cell 15 passes through suitable slits in the plates 2, 3 a few millimeters from the base of the insertion opening.

The documents can be introduced into the opening both in the vertical direction and in the horizontal direction and drop on to the base by gravity, breaking the light beam. At the same time, the roller 13 slips on a face of the document introduced if it is in contact with said roller, but the latter normally does not have sufficient frictional force to impart a horizontal starting movement along the path of travel to the document. With a certain prefixed delay time, the electromagnet 8 attracts the armature 7 for a brief space of time, thus causing a movement of the lever 4 which causes the roller 5 to press against the roller 12. This space of time is sufficient for the document gripped between the two rollers 12 and 5 to advance along the path of travel, due to the effect of the driving action exerted by the roller 12 and of the friction of the rubber 13 on the surface of the paper of the document. It should be noted that the document inserted could drop so that the bottom right-hand corner strikes against the base and is jammed during the feed operation, with possible damage to the document itself; this eventually is obviated by means of the flexible strip or tongue 16, which keeps the bottom right-hand corner of the document raised after the document has dropped into the insertion opening.

The path of travel is thereafter still defined by the plates 2, 3, which are disposed closer together in order to act as guides, while the conveying action is effected by a series of driving rollers 17, 18, 19 disposed on the same side with respect to the conveying path and which are opposed by aligning rollers 22, 23 and 24, respectively, which exert a resilient pressure against the corresponding driving rollers. Both the driving rollers 17, 18, 19 and the aligning rollers 22, 23 and 24 may be formed of sufficiently hard rubber (for example with a Shore hardness of 90–95) and, while the former have a coefficient of friction of, for example, 0.3 with respect to the paper of the documents, the latter have a greater coefficient, for example 0.8. The aligning rollers 22, 23 and 24 are therefore driven through friction by the corresponding driving rollers or by the document conveyed along the path and passing between each pair of opposite rollers.

The aligning rollers 22, 23 and 24 rotate about their respective spindles, which are normally disposed in an oblique position with respect to the direction of the path of travel of the documents and are held in the oblique position by return springs 37, 38, 39, respectively. Through the effect of the coupling of the aligning rollers through friction with the document carried along between the guides 2 and 3, a transverse drag component is created and when the bottom edge of the document has come into full contact with the aligning surface constituted by the face of the supporting plate 1, the axes of rotation of the rollers 22, 23 and 24 are brought into a position perpendicular to said path.

Figure 2:
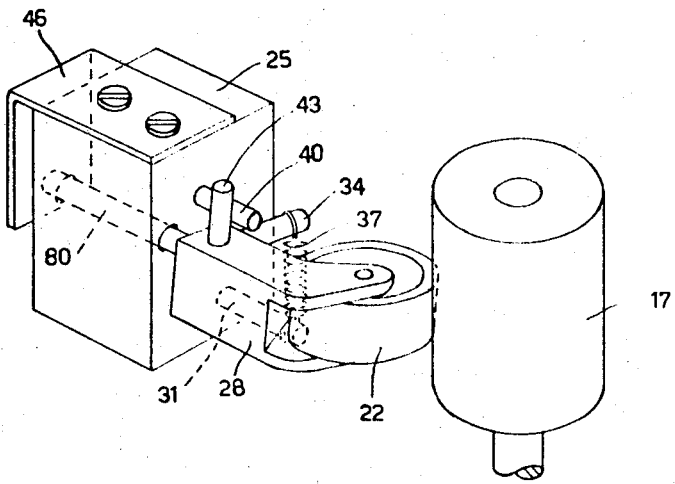
FIG. 2 is a perspective view showing the mounting of an aligning roller included in the device The feed device is incorporated in a reader for magnetic characters printed on documents with magnetizable ink and also readable by the human eye, for example as in the type of coded writing known as CMC7.

All the aligning rollers are mounted in similar manner and, therefore, the mounting and operation of only one roller the plate 1. be described with reference in particular to FIG. 2, which shows in perspective the mounting block of the roller 22 and the opposing driving roller 17. The roller 22 is mounted in a fork 28 having a pivot 80 which can turn and slide in a block 25 fixed to the supporting plate 1. The fork carries a pin 43 normally held against a stop 40 by a spring 37 stretched between two arms 34 and 31 fixed to the fork and to the block 25, respectively, so that the axis of rotation of the roller 22 is in an oblique position with respect to the plane of the platel. A resilient plate 46 is fixed to the block 25 and bent in such manner as to press against the end of the pivot 80, so that the roller 22 is urged resiliently against the driving roller 17.

In operation, the rollers 22, 23 and 24 exert a resilient thrust against the corresponding driving rollers 17, 18, 19 and, through the effect of the coupling through friction with the document fed, cooperate in the conveyance of the same along the path defined by the guides 2 and 3. Moreover, by means of the transverse movement component impressed on the documents by the inclined spindles of the aligning rollers, the documents themselves are urged so that their bottom edges come into full contact with the aligning reference surface, formed by the plate 1 and parallel to the direction of the path.

Moreover, it should be observed that, since the aligning rollers 22, 23 and 24 are held in an oblique position by means of the tension springs 37, 38 and 39, respectively, when the documents have reached the position of alignment they apply a reaction which opposes the transverse thrust and tends to bring each aligning roller into a position parallel to the feed path. In this way, possible damage to the edges of the documents because of the prolonged pressure against the reference surface and, therefore, consequent misalignment, are avoided.

The driving rollers 12, 17, 18 and 19 are driven by a belt 21 disposed in the part beneath the plate 1 and passed over pulleys coaxial with the rollers as well as over a tension pulley 20.

Passed round and driven by the driving roller 19 is a belt 49 which also passes round another three rollers 51, 52 and 53 and round a drum 50 and serves to feed the documents, at the same final speed imparted by the driving rollers 17, 18 and 19, through the reading station constituted by a magnetizing head 54 and a magnetic reading head 55.

The drum 50 is formed by a rubber-covered disc having a thickness equal to the width of the belt 49. After the document has been subjected to alignment, it is removed by the belt 49 and the drum 50, which carry it along, holding it tightly between them at the top strip of the document. The bottom strip of the document, on which the coded magnetic characters are normally printed, is free from any covering and can thus pass in succession in front of the magnetizing head 54 and the reading head 55, which are both disposed in a lower position with respect to the drum 50.

The two heads 54 and 55 slide on the front face of the document, which bears the printed characters, while on the rear face there slide two resilient leaf springs 58, 59 mounted on blocks 56 and 57, respectively, in positions opposite said heads, in such manner as to exert a pressure which keeps the document sheet travelling in perfect adherence to the two heads 54 and 55.

After the reading operation, the document is transferred from the drum 50 and the belt 49 to the collecting pocket or compartment, which is constituted by a fixed plate 61, a slidable plate 66 and a movable plate 71 adapted to define the length of the pocket. The plate 61 is bent in such manner as to facilitate the entry of the document into the collecting pocket. A guide 60 cooperates with the plate 61 to direct the document conveyed by the drum 50 and the belt 49 into the pocket.

The insertion of the document into the pocket is then further controlled by a belt 64 which is in continuous motion and passed round rollers 62 and 63. This belt 64 pulls the successive incoming documents along by friction until they are brought to the far end of the pocket.

A motor 77 mounted on top of the plate 1 is provided with a shaft extending through said plate and producing the rotation of a driving pulley 78 coaxial with the shaft itself and disposed in the part beneath the plate 1. The pulley 78 drives a belt 65 which runs over pulleys coaxial with the rollers 62, 53, 52, 51 and 19 and with the drum 50 and over a tension pulley 75, the position of which is adjustable by shifting a bolt 76 along a slot. In this way, the motion is transmitted to all the rollers of the apparatus.

The plate 66 is rendered movable in a direction perpendicular to the plate 61 by means of a shaft 69 slidable longitudinally in a bearing 68 and by means of a wheel 67 which runs on the face of the plate 1. A spring 70 draws the plate towards the plate 61 in such manner as to compress the documents as they are inserted in the pocket.

The movable wall 71 can slide in windows formed in the plate 61 and in the plate 66 and is rigidly connected to a first slider movable along a fixed rod 72 and to a second slider 74, of a type similar to the margin stops used in typewriting machines, which can be shifted by pressure along a rack rod 73 and be arrested in the the position chosen. The displacement of the slider 74 makes it possible to fix a different length of the collecting pocket according to whether long or short documents are being handled.

What we claim is:

1. The document feeding and reading apparatus comprising
    a. means for feeding an individual document including
        1. a document receiving means having two parallel sidewalls and adapted to receive a document manually insertable between said walls;
        2. a continuously rotating feeding roller projecting into the space between said walls through a slot in one of said walls and adapted to act frictionally on a face of a document inserted into said receiving means;
        3. a counterroller idly mounted on a pivotable lever and projecting into said space opposite said feeding roller through a slot in the other of said walls, said counterroller being movable by electromagnet means between a first position spaced from said feeding roller and a second position pressing a document against said feeding roller when a document is inserted therebetween and said electromagnet means is energized, said counterroller and said feeding roller cooperating to advance said document; and
        4. a photoelectric system including a light beam traversing said space between said sidewalls to energize said electromagnet when said light beam is interrupted by the presence of said document in said space;
    b. aligning means for aligning said document received by said feeding means against a reference surface including
        1. a plurality of driven first rollers for acting frictionally on one face of said document to move said document along an aligning path;
        2. a plurality of idle second rollers aligned with said first rollers for engaging the other face of said document to press said document against said first rollers, the spindles of said second rollers normally being skewed obliquely with respect to said aligning path to urge said document transversely to said aligning path until said document is fully against said reference surface and is aligned thereby;

3. the spindles of said second rollers being resiliently biased toward said skewed position whereby when said document is fully against said reference surface said spindles are rotated to a position substantially perpendicular to said aligning path;
4. said aligning means also advancing and feeding said document towards a document reading device;

c. conveying means for moving the document along a curved reading path including
   1. a rotatable drum having a cylindrical outer surface, said surface forming a moving side guide for a document; and
   2. a belt for urging one edge of said document traversing said reading path in engagement with said cylindrical outer surface of said drum for a path length at least half of the circumference of said drum to deliver said document in the direction opposed to that of the aligning path;

d. said sidewalls terminating in a guide for directing said document from said aligning path substantially tangentially to said drum to deliver said document to said conveying means;

e. a scanning device positioned within said reading path for reading the information carried by said document;

f. a document receiving guide disposed substantially tangentially to said drum for receiving said document fed by said conveying means and directing said document into a collecting pocket; and g. a collecting pocket, including
   1. a first fixed plate defining a wall of said pocket;
   2. a second movable plate disposed parallel to said first plate defining a second wall of said pocket and resiliently slidable in a direction perpendicular to said first plate to compress the documents collected in said pocket;
   3. a moving conveyor belt moving parallel to said first and second plates frictionally engaging said document engaging said document pulling said document into said pocket; and
   4. a manually movable third plate arranged perpendicular to said first and second plates and adapted to selectively define the length of said pocket.